United States Patent Office 3,537,857
Patented Nov. 3, 1970

3,537,857
PHOTOGRAPHIC MATERIAL FOR THE
SILVER-DYE-BLEACH PROCESS
Karl-Heinz Freytag and Carl Taube, Leverkusen, Bernhard Seidel, Cologne, Mulheim, and Erich Böckly, Leverkusen, Germany, assignors to Agfa-Gevaert Aktiengesellschaft, Leverkusen, Germany, a corporation of Germany
No Drawing. Filed Apr. 11, 1967, Ser. No. 629,915
Claims priority, application Germany, May 4, 1966,
A 52,367
Int. Cl. G03c 1/10
U.S. Cl. 96—99     6 Claims

ABSTRACT OF THE DISCLOSURE

Certain sulfonated aminonaphthalene azo dyes which may have a hydroxy substituent on the naphthalene ring, are particularly suited for use as magenta dyes for silver-dye-bleach photography.

---

This invention relates to photographic materials for the silver-dye-bleach process, which materials are characterized by containing a particularly light-fast magenta azo dye.

It is known that color photographic images can be produced by the silver-dye-bleach process, wherein a dye, usually an azo dye, is bleached in a homogeneously dyed colloid layer in accordance with a silver image which had been produced photographically.

It is possible to produce both negative and reversal silver-dye-bleach images. If it is desired to produce positive paper prints or duplicate positives from diapositives, the silver image is produced by means of a simple black-and-white development, this silver image representing a negative of the copying original. Since the image dye which is homogeneously distributed in the layer (or in the 3 layers of a multicolor material) is bleached proportionately to the silver image a dye image is obtained, which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original, that is to say a positive color image is formed if the original is a negative color image.

The standards set as regards dyes for the process described are particularly high, since these dyes must be spectrally suitable, and should also be easily bleachable and fast to light. Furthermore, they must not detrimentally affect the photographic emulsion and must be completely resistant to diffusion in the gelatin which is almost exclusively used as layer former. Excellent light fastness is of particular importance but resistance to acid gases such as occur in the atmosphere in industrial areas, and high brilliance, i.e. freedom from side absorption in undesired spectral regions combined with suitable spectral position of the absorption, are also of importance.

Metal complex dyes have been proposed for the silver-dye-bleach process, because of their fastness to light. It has been found, however, that these dyes are generally not sufficiently brilliant, and they are therefore of limited utility.

It is among the objects of the present invention to provide new magenta azo dyes which are particularly suitable for use in the silver-dye-bleach process.

The above object has been attained by providing magenta dyes of the following formula:

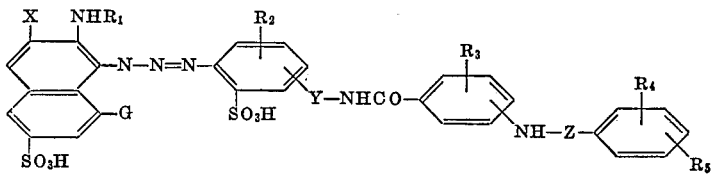

wherein

X=H or $SO_3H$;
Y=a chemical bond, an aromatic carbonamide linking member such as

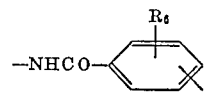

an aromatic linking member containing urea groups, such as

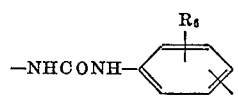

or a phthalimide ring system such as

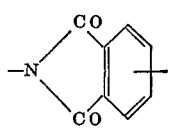

Z=—CO— or —CONH—;
$R_1$=H or alkyl, preferably with up to 3 carbon atoms which may be substituted for example with hydroxy amino, alkoxy, carboxyl, carbonamide or sulfo;

$R_2 =$ (1) H, (2) alkyl, preferably with up to 3 carbon atoms, such as methyl or ethyl which may be substituted, for example, with halogen such as fluorine or chlorine, for instance trifluoromethyl, (3) alkoxy having preferably up to 3 carbon atoms such as methoxy or ethoxy, or (4) halogen such as chlorine or bromine;

$R_3 =$ (1) H, (2) alkyl, preferably with up to 3 carbon atoms, such as methyl or ethyl which may be substituted, for example, with halogen such as fluorine or chlorine, for instance trifluoromethyl, (3) alkoxy having preferably up to 3 carbon atoms such as methoxy or ethoxy, (4) halogen such as chlorine or bromine or (5) acylamino such as acetylamino; and $G =$ H or OH.

Preferred dyes are those having the formula:

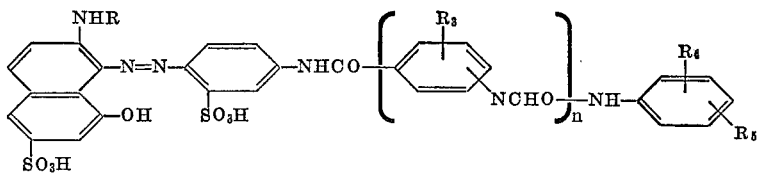

for example, with halogen such as fluorine or chlorine, for instance trifluoromethyl, (3) alkoxy having preferably up to 3 carbon atoms such as methoxy or ethoxy, (4) halogen such as chlorine or bromine or (5) acylamino such as acetylamino;

$R_4$ and $R_5 =$ (1) H, (2) alkyl, preferably with up to 3 carbon atoms which may be substituted for example with halogen for instance fluorine, chlorine or bromine, such as trifluoromethyl, hydroxyl or alkoxy, (3) alkoxy preferably with up to 2 carbon atoms, (4) halogen such as chlorine or bromine, (5) aroxy such as phenoxy, which may be further substituted, for example, with alkyl or alkoxy having preferably up to 3 carbon atoms or (6) acylamino such as acetylamino;

$R_6 =$ (1) H, (2) alkyl, preferably up to 3 carbon wherein $n = 1$, 2 or 3, preferably 1 or 2 and the other symbols have the above meanings.

Unexpectedly the non-diffusing monoazo dyes of the present invention and especially those having the preferred formula, are of considerably higher fastness especially higher light fastness, than the corresponding symmetrical diazo dyes which have smaller molecules.

It was further unexpected that in spite of the very long amino radical which is formed upon bleaching of the new dyes, the whites of the resulting dye images are in no way impaired.

One particular advantage of the dyes according to the invention is that they are fast to diffusion without any further processing, such as mordanting.

The following dyestuffs have proved to be especially suitable:

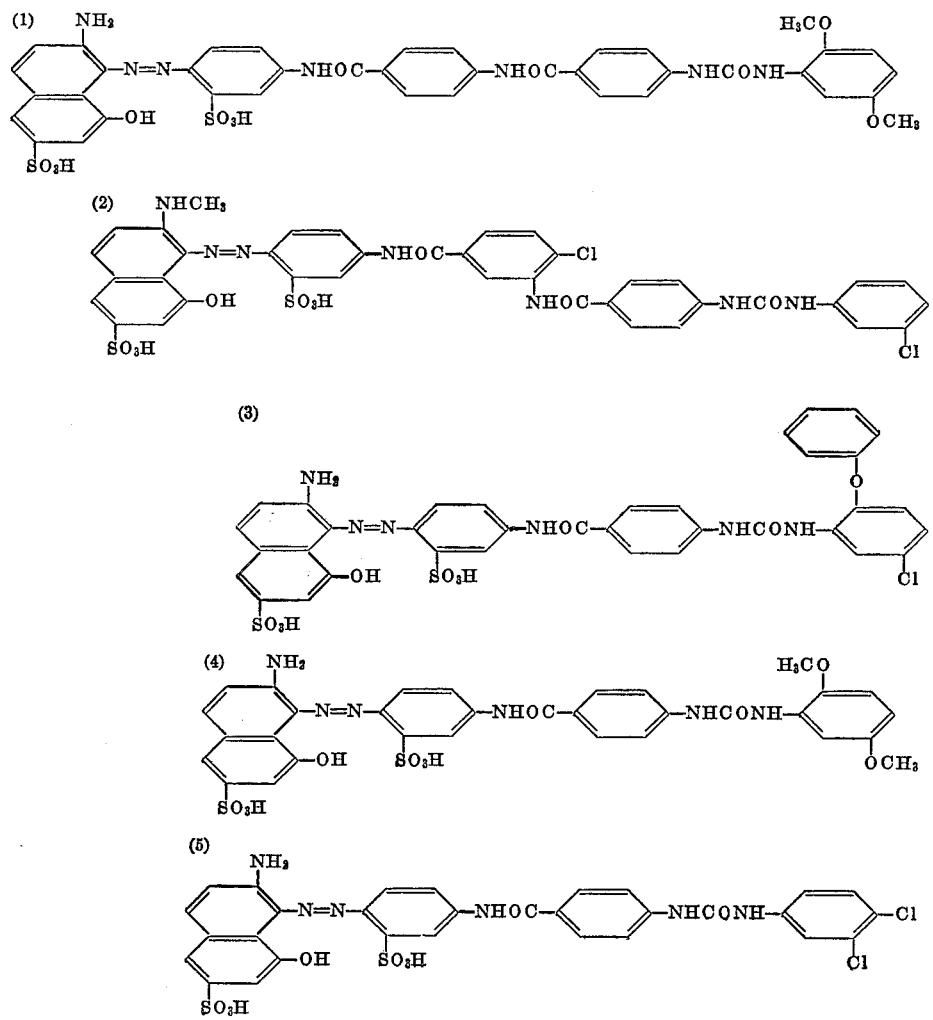

(6)
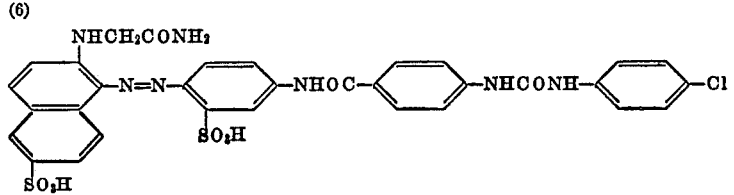
(7)
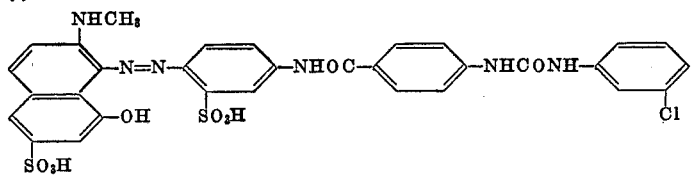
(8)
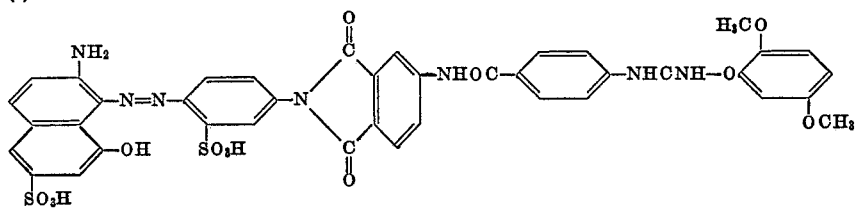
(9)
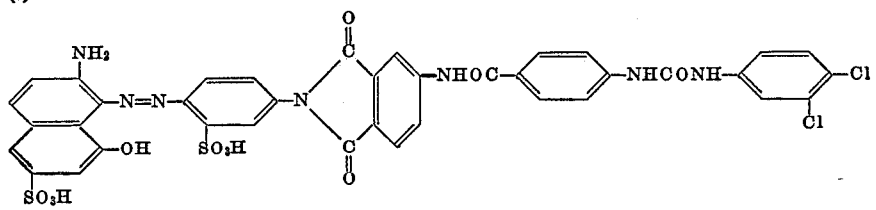
(10)
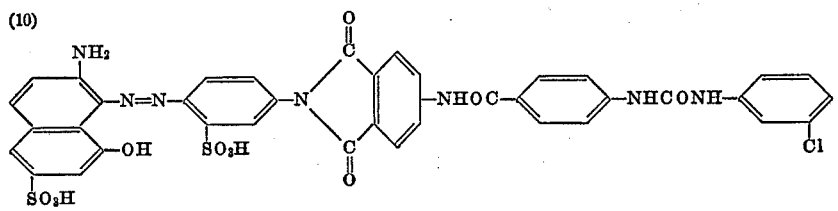
(11)
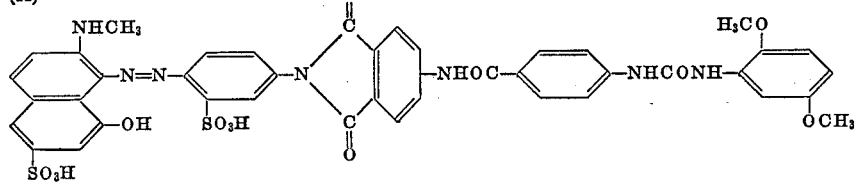
(12)
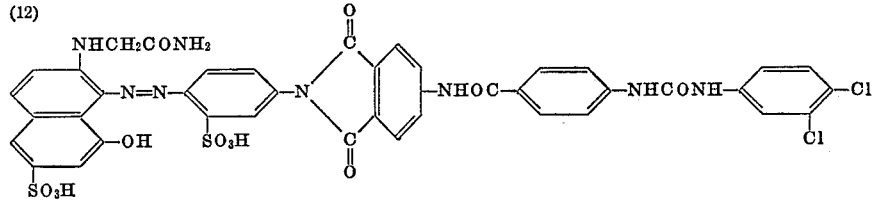
(13)
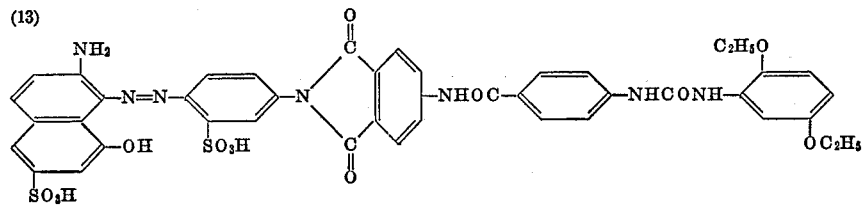

(14) 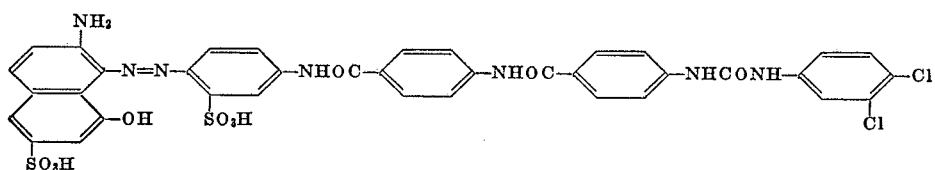
(15) 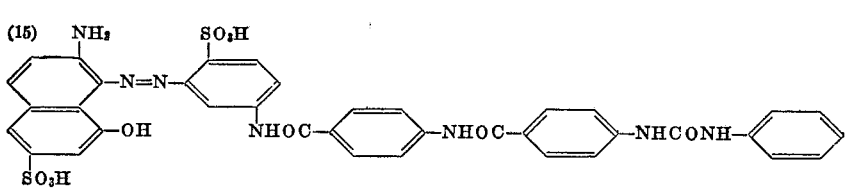
(16) 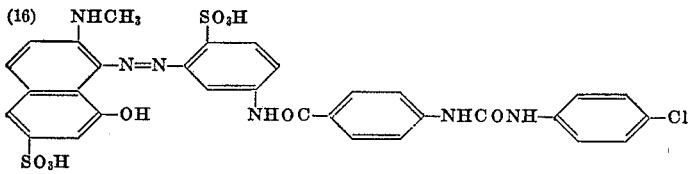
(17) 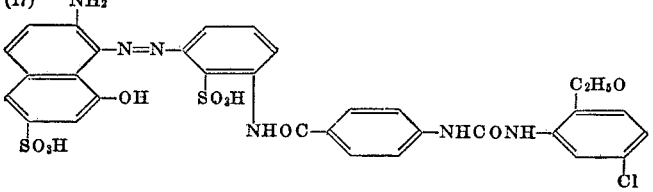
(18) 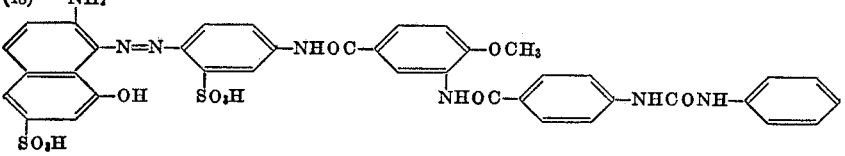
(19) 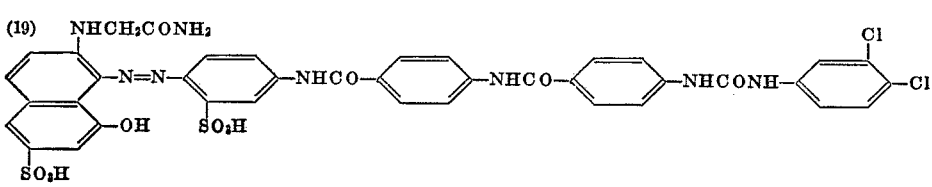
(20) 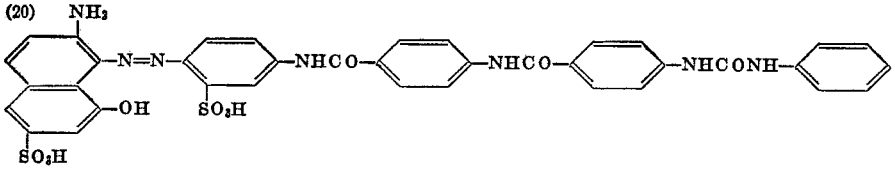
(21) 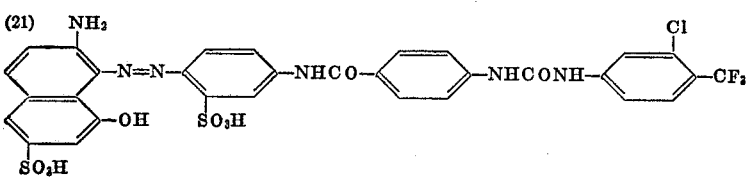
(22) 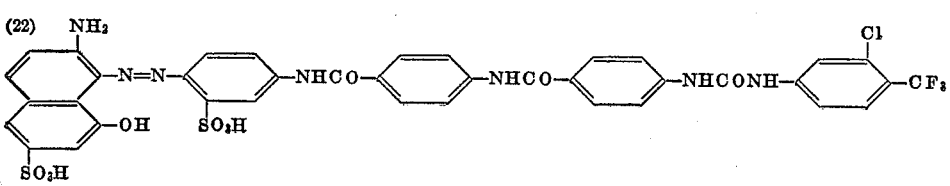

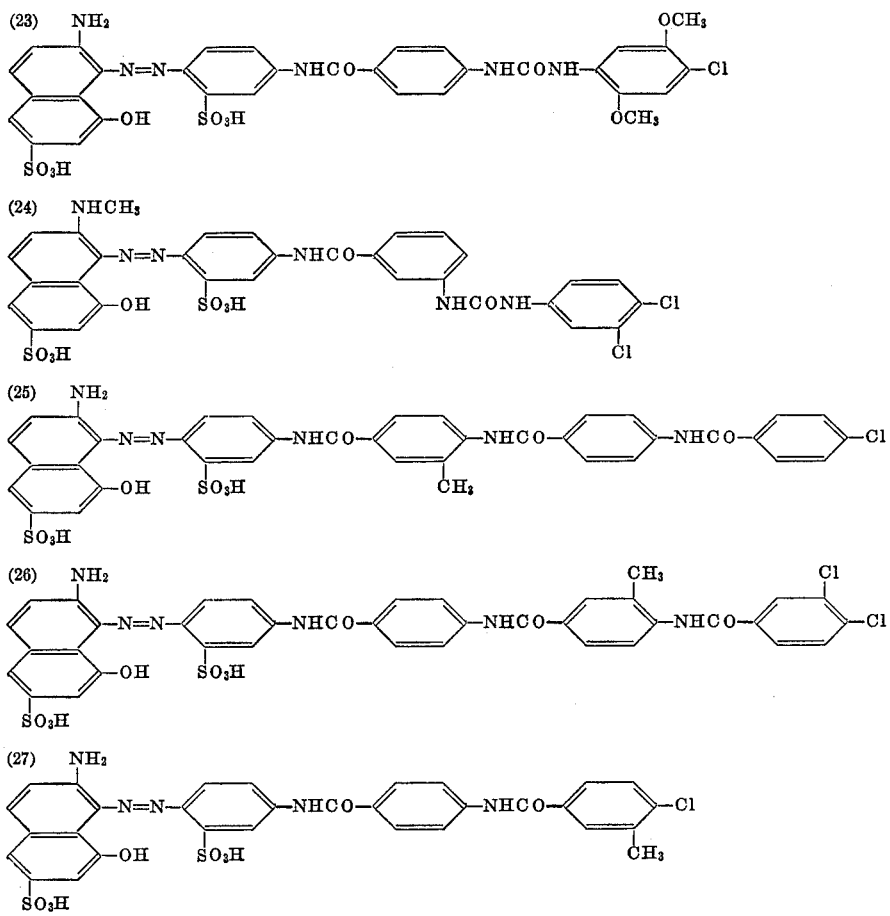

The dyes according to the invention can be prepared by the methods usual in azo dye chemistry. For example, dye 1 can be obtained by coupling the diazotized amino compound of the formula

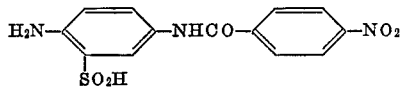

in acid solution to 2-amino-8-hydroxynaphthalene-6-sulfonic acid. The nitro group is then reduced in the usual manner, the resulting aminoazo dye is reacted with p-nitrobenzoyl chloride, and after further reduction, the amino group again obtained is reacted with 2,5-dimethoxyphenylisocyanate. The other dyes in the table are obtained in analogous manner.

On account of their excellent properties, the dyes according to the invention can be applied in color photographic layers for the silver-dye-bleach process in various ways. As will be seen from the following examples, they are preferably employed as image dyes in layers which are subjected to a simple black-and-white development and consequently form in the subsequent dye bleaching bath a direct positive dye image. However, it is also possible to carry out a black-and-white reversal development, whereby after treatment with common dye-bleaching baths, dye images with a gradation opposite to the original are obtained.

The dyes are substantially inert to agents customarily added to photographic layers, such as stabilizers, sensitizing dyes, chemical sensitizers, plasticizers, wetting agents, hardeners and the like.

As shown in the following example, they can be bleached out to pure whites in different types of bleaching baths, such as those which are based on quinoline and iodide, as described in U.S. Pat. No. 2,629,568 (Example 29) or thiourea (as indicated in British Pat. No. 507,211) and with different bleaching catalysts, such as quinoxalines or phenazine derivatives.

They can be applied onto any suitable supports, such as glass, baryta-coated papers, papers of all types which have been made water repellent, such as polyethylene-coated papers, cellulose acetate or polyesters and polycarbonate films and pigmented cellulose acetate films.

The image whites are also not discolored by exposure to light over long periods.

The examples given below explain the use of the new dyes without limiting them to the cases indicated.

EXAMPLE 1

850 ml. of a 2% gelatin solution containing 4.3 g. of dye 1 and 0.4 g. saponine are added to 500 ml. of a silver iodobromide gelatin emulsion (3 mol percent silver iodide) containing about 12 g. silver in the form of silver halide per kg. of emulsion. The emulsion is sensitized to green light with a sensitizer as described in German Auslegeschrift 1,213,240, Example 2, and applied onto two supports one of baryta-coated paper and one of cellulose triacetate. The coating has about 0.75 gram of silver in the form of silver halide per m.$^2$. After drying, 2 test strips of the material produced as described are exposed to yellow or white light behind a grey test wedge and processed as follows:

(1) Development for 5 minutes in a solution of 1 g. of p-methylaminophenol, 13 g. of anhydrous sodium sulfite, 3 g. of hydroquinone, 26 g. of anhydrous soda, and 1 g. of potassium bromide in 1000 ml. of water.

(2) Rinsing for 1 minute.

(3) Fixing for 5 minutes in a solution of 200 g. of crystalline sodium thiosulfate, and 20 g. of potassium metabisulfite in 1000 ml. of water.

(4) Rinsing for 5 minutes.

(5) Hardening for 5 minutes in a solution of 60 ml. of formalin (30%) and 15 g. of sodium bicarbonate in 1000 ml. of water.

(6) Rinsing for 5 minutes.

(7) Dye-bleaching for 15 minutes in a solution of 10 g. of potassium iodide, 10 g. of sodium hypophosphite, 25 ml. of concentrated sulfuric acid, 50 ml. of quinoline, and 10 g. of 2,3-dimethylquinoxaline in 1000 ml. of water.

(8) Rinsing for 5 minutes.

(9) Bleaching for 5 minutes in a bath of 25 g. of copper chloride and 5 ml. of concentrated hydrochloric acid in 1000 ml. of water.

(10) Fixing for 10 minutes, as under (2).

(11) Final rinsing for 20 minutes.

After drying, two diffusion-fast magenta dye images of the test are obtained with exceptionally high light fastness and brilliance.

EXAMPLE 2

The process is performed as indicated in Example 1 except that 4.0 g. of dye 3 are used instead of the dye 1. The silver halide gelatin emulsion is applied onto a white pigmented cellulose acetate support. After exposure and processing in baths 1 to 6 as in Example 1, it is processed as follows:

(7) Dye-bleaching for 5 minutes in a solution of 28 g. of thiourea, 18 g. of potassium bromide, 3 mg. of 2-amino-3-hydroxyphenazine and 400 ml. of concentrated hydrochloric acid in 1000 ml. of water.

(8) Rinsing for 5 minutes.

(9) Bleach-fixing for 10 minutes in a solution of 26 g. of tetrasodium-ethylenediamine-tetraacetate, 24 g. of anhydrous soda, 15 g. of ferric chloride, 13 g. of anhydrous sodium sulfite and 200 g. of crystallized thiosulfate in 800 ml. of water.

(10) Final rinsing for 20 minutes.

After drying a result similar to that in Example 1 is obtained.

EXAMPLE 3

The procedure is as described in Example 1 but dye 1 is replaced by dye 14 of the table or any other dye specified therein. Similar results are obtained.

EXAMPLE 4

The process is performed as described in Example 1, but the exposed dye-containing silver halide emulsion layer is processed as follows:

(1) Development for 5 minutes in a bath, as indicated in Example 1.

(2) Rinsing for 1 minute.

(3) Bleaching for 1 minute in a solution of 10 g. of potassium dichromate, and 5 g. of concentrated sulfuric acid in 800 ml. of water.

(4) Rinsing for 1 minute.

(5) Clarifying for 1 minute in a bath of 5 g. of anhydrous sodium sulfite in 1000 ml. of water.

(6) Rinsing for 1 minute.

(7) Second uniform exposure for 2½ minutes with a 40 watt lamp at a distance of 20 cm.

(8) Second development as under 1.

(9) Hardening and further processing as in Example 1, using the baths 5–11 of Example 1.

A magenta dye wedge is obtained which has a gradation opposite to that of the original.

EXAMPLE 5

A color-photographic multi-layer material for the silver-dye-bleach process is prepared as follows:

The following layers are successively cast onto a baryta-coated paper:

(1) A red-sensitized layer which contains per 500 ml. of a silver iodobromide emulsion (2 mol percent silver iodide), 12 mg. of a sensitizer described in German Auslegeschrift 1,213,240, Example 11, and 2.7 g. of the cyan dye of the following formula:

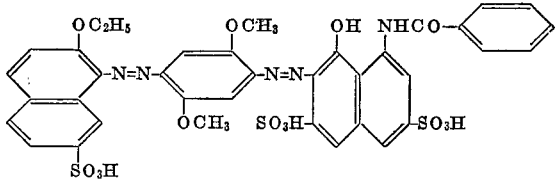

which may be prepared according to French Pat. No. 1,471,787, dissolved in 250 ml. of a 2% gelatin solution which contains 0.35 g. saponine and 1.5 ml. of a 30% Formalin solution. The final layer contains about 0.75 g. of silver in the form of silver halide per square meter.

(2) An intermediate layer of 3% gelatin solution.

(3) A green sensitized layer as described in Example 2.

(4) An intermediate layer of a 3.5% gelatin solution to which 8 g. of tartrazine per liter have been added.

(5) A blue-sensitive layer which has not been sensitized and which contains, per 500 ml. of a silver bromide gelatin emulsion with a silver content of about 11 g./kg., 3.1 g. of the yellow dye of the following formula:

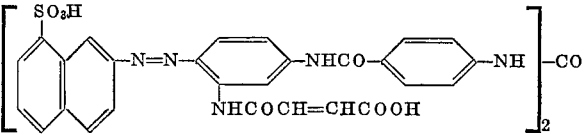

which may be prepared according to Belgian Pat. No. 668,339. The usual quantities of wetting agents (0.35 g. saponin) and hardeners (2.5 ml. of a 30% aqueous formaldehyde solution) are added. The final layer contains 0.6 g. silver in the form of silver halide per square meter.

(6) A protective layer of 2% gelatin solution.

After drying, the material is exposed behind a multicolor transparent original and processed as described in Example 1, with the exception that 50–100 mg. of 2,3-dimethyl-quinoxaline are added to the bleaching bath and the processing period is increased to 25 minutes.

A reproduction of the original in true colors is obtained.

We claim:

1. A light-sensitive silver-dye-bleach silver halide emulsion in which the silver-dye-bleach dye has the formula:

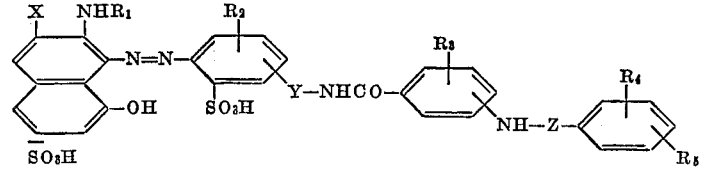

wherein:

X=H or SO₃H;

Y=a chemical bond or a linking member selected from those having the following formulae:

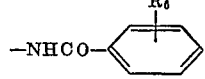

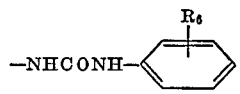

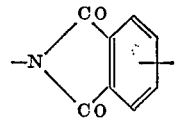

Z=—CO— or —CONH—;
$R_1$=H or alkyl;
$R_2$=(1) H, (2) alkyl, (3) alkoxy or (4) halogen;
$R_3$=(1) H, (2) alkyl, (3) alkoxy, (4) halogen or (5) acylamino;

$R_4$ and $R_5$=(1) H, (2) alkyl, (3) alkoxy, (4) halogen, (5) aroxy or (6) acylamino;

$R_6$=H, alkyl having up to 3 carbon atoms, alkoxy having up to 3 carbon atoms, halogen or acylamino.

2. A light-sensitive photographic material as defined in claim 1 in which the dye has the formula:

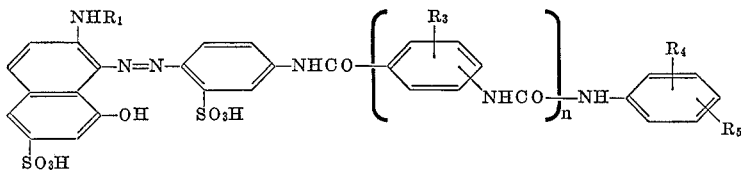

$R_1$=H or alkyl having up to 3 carbon atoms, hydroxy substituted alkyl, amino substituted alkyl, alkoxy substituted alkyl, carboxy substituted alkyl, or sulfo substituted alkyl;
$R_3$=H, alkyl having up to 3 carbon atoms, alkoxy having up to 3 carbon atoms, halogen or acyl amino;
$R_4$ or $R_5$=H, alkyl having up to 3 carbon atoms, alkyl having up to 3 carbon atoms substituted with halogen, hydroxyl or alkoxy, alkoxy having up to 2 carbon atoms, halogen phenoxy or acyl amino; and
$n$=1, 2 or 3.

3. Light-sensitive photographic material as defined in claim 1, wherein the dye has the formula:

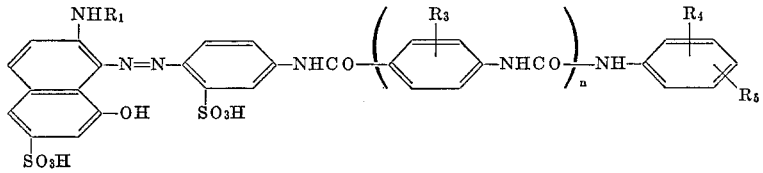

4. Light-sensitive photographic material as defined in claim 1, wherein the dye has the formula:

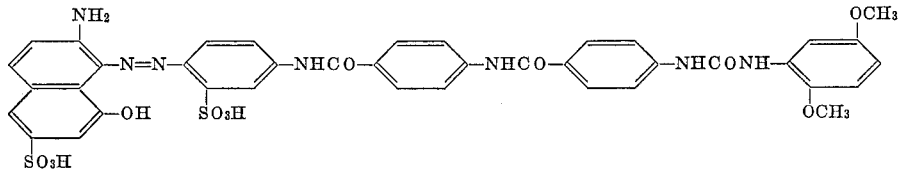

5. Light-sensitive photographic material as defined in claim 1, wherein the dye has the formula:

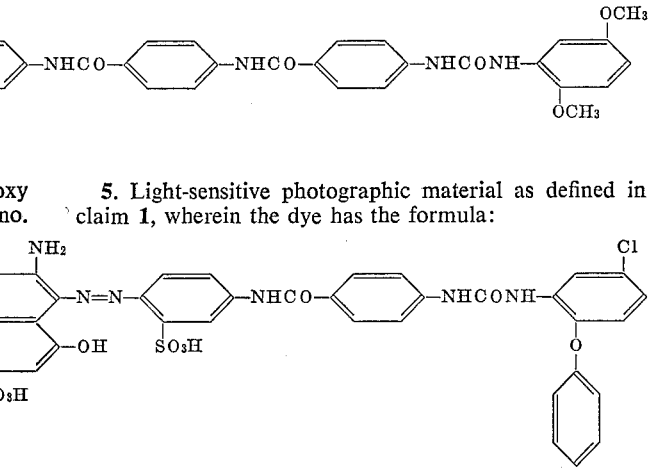

6. Light-sensitive photographic material as defined in claim 1, wherein the dye has the formula:

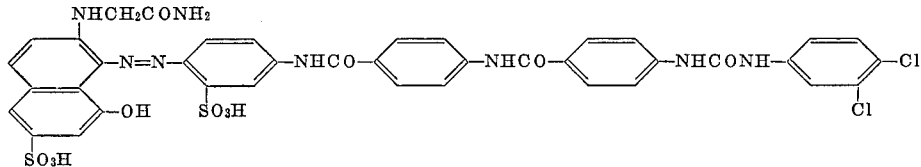

References Cited
UNITED STATES PATENTS
3,211,554  10/1965  Dreyfuss _____ 96—99
3,454,402  7/1969   Anderau et al. _____ 96—99

J. TRAVIS BROWN, Primary Examiner.

U.S. Cl. X.R.
96—20